UNITED STATES PATENT OFFICE.

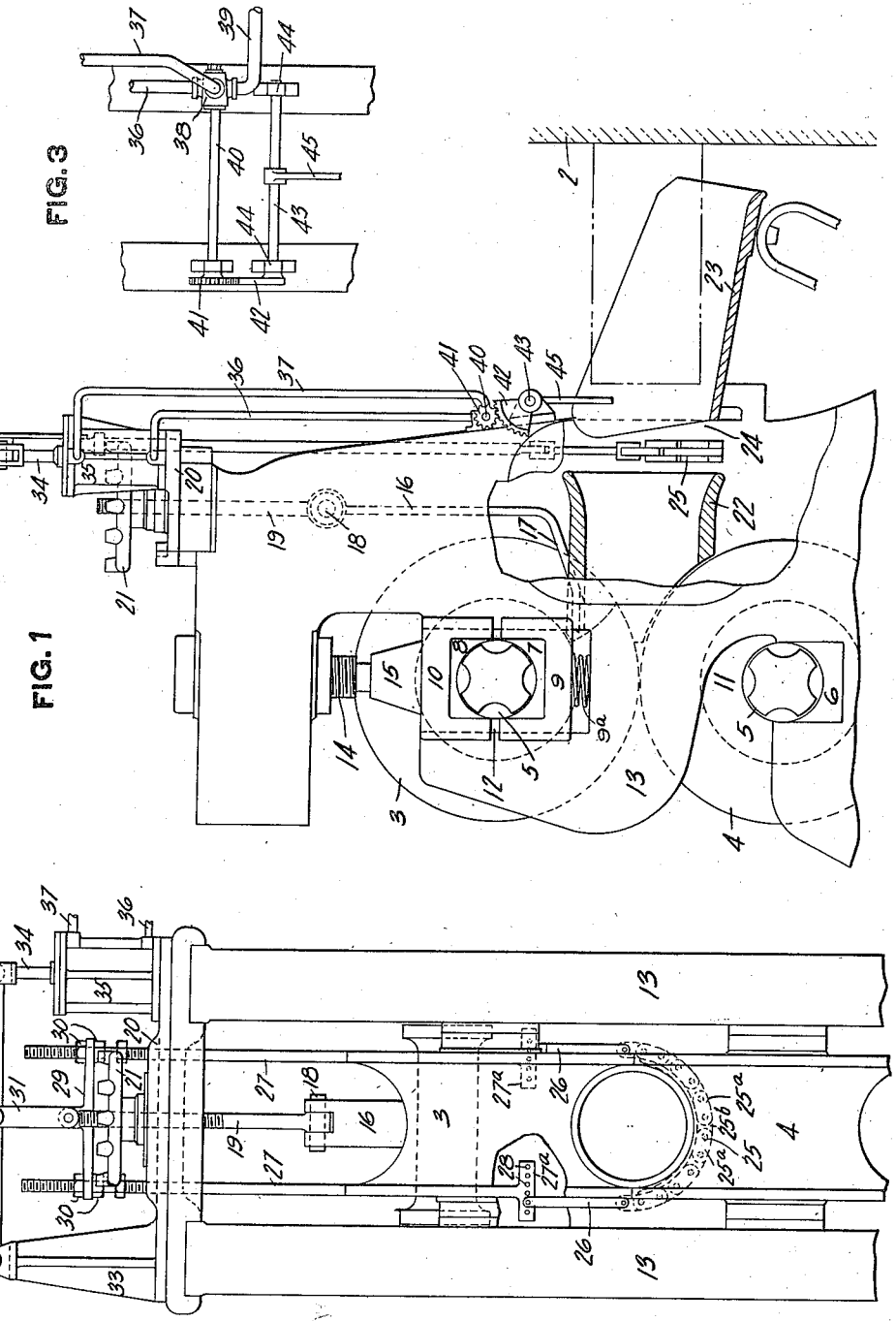

CHARLES FELL, OF ELYRIA, OHIO, ASSIGNOR TO NATIONAL TUBE COMPANY, OF PITTSBURGH, PENNSYLVANIA, A CORPORATION OF NEW JERSEY.

APPARATUS FOR SCRAPING PIPE-SKELP.

1,142,950.                    Specification of Letters Patent.    Patented June 15, 1915.

Application filed November 25, 1914. Serial No. 874,059.

*To all whom it may concern:*

Be it known that I, CHARLES FELL, a citizen of the United States, and resident of Elyria, in the county of Lorain and State of Ohio, have invented certain new and useful Improvements in Apparatus for Scraping Pipe-Skelp, of which the following is a specification.

My invention relates to the manufacture of welded pipe, and while not restricted to such use more particularly relates to the manufacture of lap welded pipe of the larger sizes in the manufacture of which the pipe skelp are bent preparatory to heating for the pipe welding operation.

In the manufacture of such pipes, some cinder adheres to the bottom surface or surfaces of the bent skelp or pipes, which rest on the bottom of the heating furnace, and when not removed before the skelp or pipe enters the welding rolls, the cinder is rolled into the surface of the pipes or tubes and afterward falls out, so that even in cases where serious damage is not done to the pipes by indenting the surface of the pipes, the surface will be roughened to an extent which detracts from its appearance.

One object of my invention is to provide apparatus for removing cinder adhering to the under surface of the pipe skelp after the skelp is heated and prior to the welding operation.

Another object of my invention is to provide scraping apparatus having novel means whereby the scraper is automatically caused to engage with the surface of the pipe skelp to be scraped as the pipe advances from the heating furnace into the welding rolls.

A further object of my invention is to provide a pipe scraping apparatus which is adapted for use on various sizes of pipes, and still further objects of my invention consist in the novel construction and arrangement of parts, as will be more fully described hereinafter and specifically pointed out in the appended claims.

Referring now to the drawings, forming part of this specification, Figure 1 is a side elevation, partly in section, showing pipe welding rolls equipped with my improved pipe scraping mechanism. Fig. 2 is an end elevation of the same, partly broken away. Fig. 3 is a front elevation showing the arrangement of the valve and valve operating mechanism by which the scraping mechanism is automatically caused to engage with the skelp in the skelp scraping operations.

Referring to the accompanying drawings, the numeral 2 designates the exit end of a heating furnace having a stand of welding rolls positioned in front thereof, in line with the door or opening in the furnace through which the pipe skelp pass from the furnace to the welding rolls. The welding rolls consist of the usual top roll 3 and bottom roll 4, these rolls having necks 5 by which they are mounted in the bottom roll bearings 6 and the top roll bearings 7 and 8. The bearings 7 and 8 are removably secured in the riders 9 and 10.

The bearings 6 and riders 9 and 10 are secured in the windows 11 and 12 of the roll housings 13, 13, and an adjusting screw 14 is employed on each housing 13 to hold the top roll and its bearings in adjusted position in the housings, a breaker block 15 being provided between the riders 10 for the top roll and the lower end of the adjusting screws 14.

As a variety of sizes of pipes or tubes will be heated at different times in each furnace, rolls 3 and 4 corresponding to the different sizes of pipe being made, are used in the roll housings 13. The level of the bottom of the furnace being at a fixed point, a change in the size of the pipe being welded requires that the bottom roll 4 be lined or adjusted upwardly or downwardly, and that a corresponding adjustment be made in the relative vertical position of the top roll 3. For this reason the adjusting screws 14 are made of a length which enables any required vertical adjustments of the rolls being made.

The top roll 3 and its bearing are adapted to move vertically in the windows 12 of the housing. The springs 9ª between the bottom riders 9 for the top roll 3, and the bottom of the housing window 12 for the top roll, form a support by which the top roll 3 is yieldingly held in its raised position. In this way the top roll is positioned so that the collars of the rolls do not "ride" when a pipe is not being welded and possible damage to the apparatus which otherwise might be caused by the pipe skelp when entering the welding rolls is avoided and overcome. A guide formed by the bent strap 16 which has a lip 17 is suspended in front of the roll above the axis of the pass, the lip 17 projecting forwardly so as to engage with the scarfed edge of the skelp being welded and pressing the uppermost overlapping edge of the skelp downwardly into engagement with the other edge as the skelp moves forwardly into engagement with the welding rolls. The upper end of this strap 16 is pivotally connected by a pin or bolt 18 to an adjusting screw 19 which extends vertically upward through a horizontal support or cap 20 mounted on top of the housings and extending between the housings so as to form a spreader or separator to keep the upper ends of the housings in spaced relation. An adjusting wheel 21 is provided on the top of the support 20, having a screw threaded opening through which the threaded upper end of the adjusting screw 19 projects to enable the lip 17 of the guide to be adjusted vertically to suit the particular size of pipes or tubes being welded.

A removable bell-mouthed guide 22 is provided on the entering side of the welding rolls, and in front of this guide is an inclined trough or guide 23 which also is supported on the housings. A gap 24 is formed between the adjacent ends of the guide 22 and trough 23, and within this gap is the flexible scraper by which the pipe skelp are scraped as they pass from the furnace into the rolls, and any cinder adhering to the under surface of the pipes is thereby removed.

The scraper 25 is made of a short chain comprising a series of double links 25$^a$ pivotally connected by intermediate single links 25$^b$. The ends of the chain 25 forming the flexible scraper are adjustably connected by straps 26 to the lower ends of the vertically adjustable rods or bolts 27, 27. As shown, the adjustable bolts 27 have T-shaped lower ends 27$^a$, and a series of holes 28 in each of the horizontally extending branches 27$^a$ afford means for adjusting the chain scraper to suit pipes or tubes of various diameters.

The upper ends of the bolts 27 are screw threaded and the screw threaded ends are adjustably connected to a crosshead 29, nuts 30 being provided on each bolt at opposite sides of the crosshead to hold the bolts in adjusted position thereon. The crosshead 29 is pivotally connected at the middle of its length by a link 31 to a lever 32 at an intermediate point in the length of the lever. This lever 32 is pivoted at one end to a stand or pedestal 33 mounted on top of the support 20 on top of and extending between the housings 13. The opposite end of the lever 32 is pivotally connected to the piston rod 34 of a fluid pressure cylinder 35 also mounted on the support 20.

The cylinder 35 is connected at its opposite ends, on opposite sides of the piston in the cylinder, by pipes 36 and 37, to a four-way valve 38, and this valve is connected by a pipe 39 to a suitable source of fluid pressure. The stem 40 of the valve 38 is connected to a spur pinion 41, the valve being mounted in a suitable position on the side of one housing 13. A segmental gear 42 is secured on one end of a shaft 43 which is mounted at its ends in bearings 44 on the sides of the housings, this gear 42 meshing with the pinion 41 on the valve stem 40. The shaft 43 is provided at an intermediate point in its length with a downwardly extending trigger or arm 45 which is arranged and made of sufficient weight to normally extend vertically downward into the path of the pipe skelp as the skelp moves forwardly out of the furnace into the bite of the welding rolls 3 and 4.

In the operation of my improved apparatus, the rolls, which are power driven, are mounted and adjusted in the windows of the housings 13. The chain scraper 25 is then adjusted so as to be suspended below the path of movement of the skelp as the skelp moves lengthwise from the furnace 2 into the bite of the rolls.

As the pipe skelp is propelled forwardly out of the exit opening in the furnace its upper surface engages with the trigger 45 suspended in the path of movement of the pipe skelp. When engaged by the bent pipe skelp the trigger 45 is caused to swing and its movement actuates the segmental gear 42 and through the pinion 41 on the valve stem 40 turns the valve into position to admit fluid pressure through the pipe 36 into the lower end of the fluid pressure cylinder 35. When air or other fluid pressure is admitted to this end of the cylinder, the piston rod 34 is moved upwardly and its movement swings the lever 32 on the pivot stand 33 and causes the crosshead 29 to raise the scraper rods 27, 27, and bring the scraper 25 into engagement with the lower surface of the forwardly moving pipe skelp. The trigger 45 being held in this position as long as the pipe is passing beneath it, the scraper 25 is held in engagement with the traveling pipe skelp, and removes any cinder adhering to the under surface of the skelp.

When the rear end of the skelp passes out of engagement with the trigger 45 the weight of this trigger will cause it to return by gravity to a vertically depending position, and this movement, through the segmental gear 42 and pinion 41 turns the valve to admit fluid pressure through the pipe 37 to the top end of the cylinder, and causes the piston to move downwardly and move the piston rod 34 from its extended position until again in the position shown in the drawings. The return movement of the piston moves the scraper out of the path of the forward end of the next skelp caused to pass into the welding rolls, and in this way the pipe skelp are automatically scraped during their passage from the heating furnace into the welding rolls.

The advantages of my invention will be apparent to those skilled in the art. By the use of my improved apparatus the cinder is removed from the lower surface of the pipe skelp immediately prior to the welding operation, and in this way damage to the surface of the skelp otherwise possible in the welding operation is prevented and overcome.

The apparatus is simple and is easily kept in repair, and by its use the number of defective and imperfect or second grade pipes made is materially lessened.

Modifications in the construction and arrangement of the parts may be made without departing from my invention.

The scraper may be manually operated instead of being arranged to operate automatically, as shown. The means employed in actuating the mechanism may be varied, and other changes may be made within the scope of the appended claims.

I claim:

1. In apparatus for making pipes or tubes, the combination with welding rolls, of an articulated scraper on the entering side of said rolls, said scraper being movable into scraping engagement with skelp passing through the welding rolls, and means for moving the scraper into engagement with the skelp.

2. In apparatus for making pipes or tubes, the combination with welding rolls, of an articulated scraper on the entering side of said rolls, said scraper being movable into scraping engagement with skelp passing through the welding rolls, means for moving the scraper into engagement with the skelp, and means actuated by the skelp for operating said scraper moving means to move the scraper into and out of skelp scraping position.

3. Skelp scraping mechanism comprising a link chain forming a flexible scraper, means connected to the ends of said chain to suspend the chain in the path of the skelp, and a fluid pressure cylinder to which the chain suspending means is operatively connected for lifting the scraper into scraping position.

4. Skelp scraping mechanism comprising a link chain forming a flexible scraper, means connected to the ends of said chain to suspend the chain in the path of the skelp, and a fluid pressure cylinder to which the chain suspending means is operatively connected for lifting the chain into scraping position, said chain being adjustably secured on the chain suspending means to adapt the chain for use in scraping skelp of varying sizes.

5. Skelp scraping mechanism comprising a link chain forming a flexible scraper, means connected to the ends of said chain to suspend the chain in the path of the skelp, a fluid pressure cylinder to which the chain suspending means is operatively connected for lifting the chain into scraping position, and means operated by the skelp being scraped for controlling the operation of said cylinder in moving the chain into scraping position.

In testimony whereof, I have hereunto set my hand.

CHARLES FELL.

Witnesses:
ARTHUR R. GERBER,
DAVID H. PINKNEY.